United States Patent
Schiel

(10) Patent No.: US 11,061,799 B1
(45) Date of Patent: Jul. 13, 2021

(54) LOG ANALYSIS APPLICATION

(71) Applicant: CERNER INNOVATION, INC., Kansas City, KS (US)

(72) Inventor: Michael Schiel, Eaglesville, PA (US)

(73) Assignee: CERNER INNOVATION, INC., Kansas City, KS (US)

( * ) Notice: Subject to any disclaimer, the term of this patent is extended or adjusted under 35 U.S.C. 154(b) by 392 days.

(21) Appl. No.: 15/856,734

(22) Filed: Dec. 28, 2017

(51) Int. Cl.
 *G06F 11/34* (2006.01)
 *G06F 11/07* (2006.01)

(52) U.S. Cl.
 CPC ...... *G06F 11/3476* (2013.01); *G06F 11/0709* (2013.01); *G06F 11/0712* (2013.01)

(58) Field of Classification Search
 CPC ............. G06F 11/3476; G06F 11/0709; G06F 11/0712
 See application file for complete search history.

(56) References Cited

U.S. PATENT DOCUMENTS

| | | | | |
|---|---|---|---|---|
| 2001/0037374 | A1* | 11/2001 | Shrum | H04L 67/14 709/217 |
| 2003/0225872 | A1* | 12/2003 | Bartek | G06F 11/3476 709/223 |
| 2006/0026149 | A1* | 2/2006 | Marsh | H04L 67/12 |
| 2006/0218629 | A1* | 9/2006 | Pearson | H04L 63/0815 726/8 |
| 2007/0106754 | A1* | 5/2007 | Moore | G06F 21/604 709/217 |
| 2008/0046576 | A1* | 2/2008 | Wahl | H04L 61/1523 709/228 |
| 2011/0119747 | A1* | 5/2011 | Lambiase | H04L 9/3234 726/8 |
| 2015/0370626 | A1* | 12/2015 | Miyagawa | G06F 11/3409 714/45 |

* cited by examiner

*Primary Examiner* — Nicholas R Taylor
*Assistant Examiner* — Tania M Pena-Santana
(74) *Attorney, Agent, or Firm* — Shook, Hardy & Bacon L.L.P.

(57) ABSTRACT

A method and system for performing queries on a consolidated log directory for multiple servers in a client environment is provided. The log analysis application provides a single login for a user into multiple servers in a client environment. This allows the user to quickly and efficiently navigate client servers and client error log files to troubleshoot and perform pre-configured queries on the log files and client data.

10 Claims, 21 Drawing Sheets

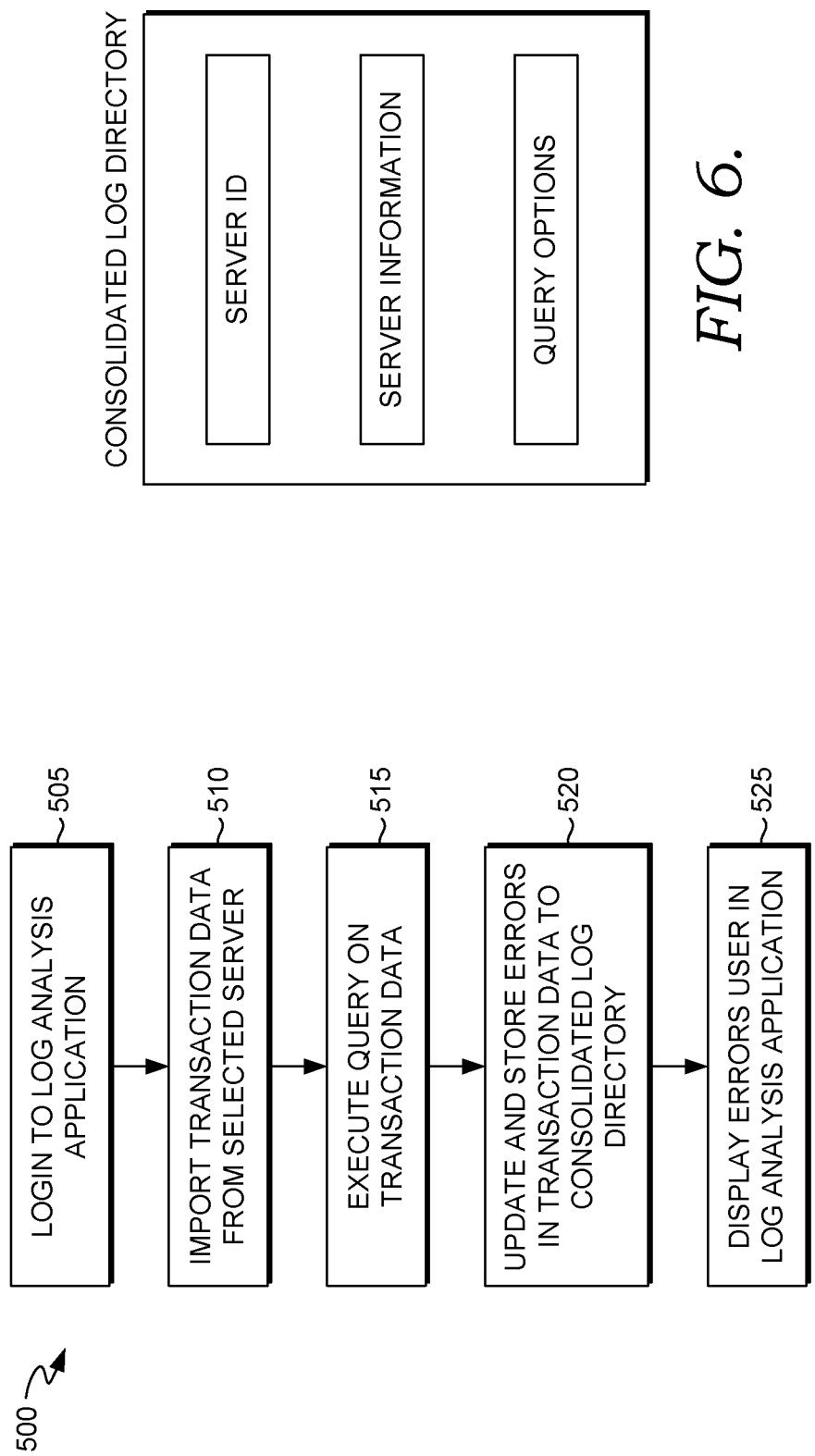

| NAME ▲ | DATE MODIFIED | TYPE |
|---|---|---|
| 📁 4.1 MODEL LINKS | 2/14/2018 11:58 AM | FILE FOLDER |
| 📁 4.2 MODEL LINKS | 2/3/2018 4:30 PM | FILE FOLDER |
| 📁 COUNTY HOSPITAL | 10/27/2018 2:25 AM | FILE FOLDER |
| 📁 MEDICAL CENTER | 2/8/2018 7:53AM | FILE FOLDER |
| 📁 HOSPITAL | 11/22/2018 2:26 PM | FILE FOLDER |
| 📁 O HOSPITAL | 2/22/2018 1:00 PM | FILE FOLDER |
| 📁 B HOSPITAL | 1/27/2018 3:02 PM | FILE FOLDER |
| 📁 C HOSPITAL | 2/25/20018 1:25 AM | FILE FOLDER |
| 📁 D HOSPITAL | 3/3/2018 3:16 AM | FILE FOLDER |
| 📁 E HOSPITAL | 12/27/2018 5:58 PM | FILE FOLDER |
| 📁 F HOSPITAL | 9/29/2018 5:15 AM | FILE FOLDER |
| 📁 G HOSPITAL | 3/10/2018 11:20 AM | FILE FOLDER |
| 📁 H HOSPITAL | 3/10/2018 7:44 AM | FILE FOLDER |
| 📁 I HOSPITAL | 2/8/2018 4:24 AM | FILE FOLDER |
| 📁 J HOSPITAL | 1/18/2018 2:39 PM | FILE FOLDER |
| 📁 K HOSPITAL | 1/24/2018 7:32 AM | FILE FOLDER |
| 📁 L HOSPITAL | 12/30/2018 2:47 AM | FILE FOLDER |

*FIG. 8.*

```
1   <html>
2   <h1>Client Report</h1>
3   <div>==============</div>
4   <body id=11body'>
5     <link rel=11stylesheet11 type=11 text/css11 href=11 styles/global, css" />
6     <script language=1VBScript11 >
7
8     '### Declare your objects for the page ###
9     Set fso = CreateObject { "Scripting, FileSystemObject")
10
11    "Include the QA object into this module
12    Include
13
14
15    Set QA= new QueryACCDB
16    QA, setDatasource "ASP, accdb"
17
18    Set rs = QA. executeSP ("getClientUsingHHRR" , "")
19
20    While Not rs. EOF
21        client = rs, Fields (0), value & "<br>"
22        document.Write client
23
24        rs.MoveNext
25    Wend
26
27    QA,closeConnection
28
29    Sub Include
30        set f=fso. OpenTextFile {"DataAccessLayer\queryACCDB\Classes\QueryACCDB. vbs")
31        data=f.read.All
32        ExecuteGlobal data
33
34        f.Close
35    End Sub
36    </script>
37  </body>
38  </html>
```

LOG ANALYSIS APPLICATION

BACKGROUND

It is difficult to troubleshoot and remotely monitor servers, such as virtual servers, for a client environment. Typically, a user will have to log into each server individually, navigate to the log file and see if there are issues to troubleshoot. If the user does not find the error located on that server, the user must then log into another server in the environment and so on until the user finally locates the error.

Once the error is finally located, the user has to write SQL queries in order analyze the data and logs from multiple servers in a client environment. Alternatively, the user will have to go searching throughout other systems to find analysis tools to analyze the data. This process is costly and time consuming for the user and the client. While the user is attempting to find the error causing the problem, the client server is not optimally performing causing trouble and delay on the client side.

SUMMARY

Embodiments of the present invention provide methods and system for performing queries on a consolidated log directory for multiple servers in a client environment. The log analysis application provides a single login for a user into multiple servers in a client environment. This allows the user to quickly and efficient navigate client servers and client error log files to troubleshoot and perform pre-configured queries on the log files and client data.

Unlike prior solutions, the user does not need to log into separate servers, go searching for analysis tools or write their own sql queries in order to analyze the data and logs from multiple servers in a client environment.

The claimed invention relates to a system and method supporting computerized medical and financial relational database systems. The multiple servers host a transaction application for electronically exchanging transaction information between the client and third party. The user logs into a single log analysis application to sign into multiple servers simultaneously. The log analysis application creates a consolidated log directory from the log files from each of the multiple servers. The consolidated log directory is database of a user-selectable server option for each of the multiple servers in the client environment. The user is provided with selectable log query options to access open logs for one or more of the multiple servers. The user's selection of the one or more servers and one or more query options are received. The query is executed for the one or more selected servers and the consolidated log directory is updated with the results.

The claimed solution is necessarily rooted in computerized electronic medical and financial medical claims relational database technology in order to overcome a problem specifically arising in the realm of computer medical and financial relational database technology. The claims address the problem of quickly and efficiently executing log queries for multiple servers in a client environment.

The claimed system and method of the present application represents a new paradigm in log file troubleshooting by querying and documenting hundreds if not thousands of client servers in multiple client environments. Not only does the claimed invention provide a way for a user to log into multiple servers in a client environment simultaneously, it provides queries to be performed on the server log files and the transaction application data from a single tool.

This allows a user to quickly and efficiently troubleshoot problems with servers and the overall client environment from a single tool. Previously, it was a time consuming and error prone method of a user manually logging into multiple servers and scanning log files to spot issues with the client's environment. Additionally, the user had to manual develop queries and locate tools to trouble shoot issues in the client environment.

The method and system for providing the user with the capability to sign into multiple servers and client environments simultaneously reduces the overall time to trouble shoot issues with the client environment. The log analysis application tool according to the new technology saves time and cost as the information for the client environment is provided to the user in a single tool.

BRIEF DESCRIPTION OF THE DRAWINGS

Embodiments are described in detail below with reference to the attached drawing figures, wherein:

FIG. 5 is a flow diagram depicts a process for executing queries on transaction data using the log analysis application;

FIG. 6 is depicts a consolidated log directory of a log analysis application;

FIG. 8 is an interactive graphical user interface displaying and sorting client environments using the log analysis application;

FIGS. 20-21 are interactive graphical user interface of a user build tool;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
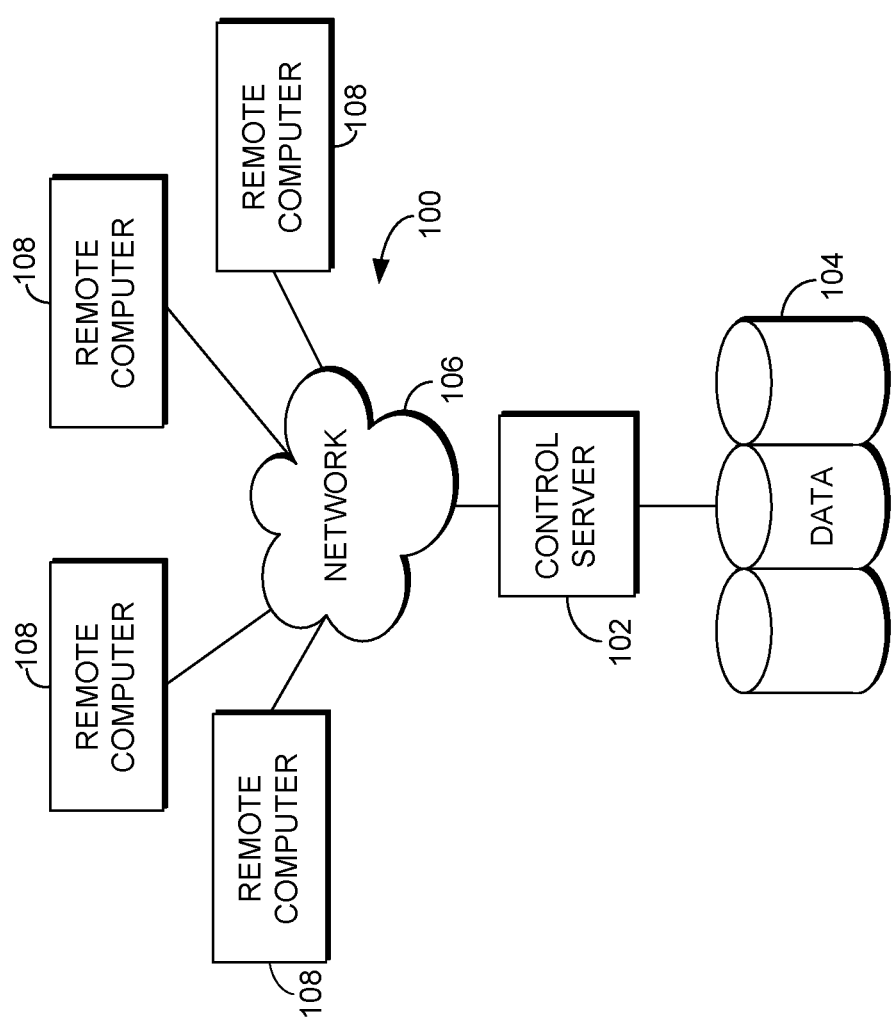
FIG. 1 is a block diagram of an exemplary computing environment suitable to implement embodiments of the present invention.

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Clinicians may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Embodiments of the present invention may be implemented in a cloud-computing environment. The cloud-computing network may comprise single or multiple servers running single or multiple virtual machines. A client server with active relational database files is typically located a location such as a pharmacy, hospital system electronic medical record, or financial services remote from an control server or servers in a cloud-computing environment. Server information and transaction application information is transferred, consolidated and queried by control server in a cloud-computing environment in a timely, efficient and secure manner using embodiments of the present invention. Client servers are queried by a log analysis application for log files or are opened by a log analysis application using Microsoft's Universal Naming Convention (UNC).

Figure 2:
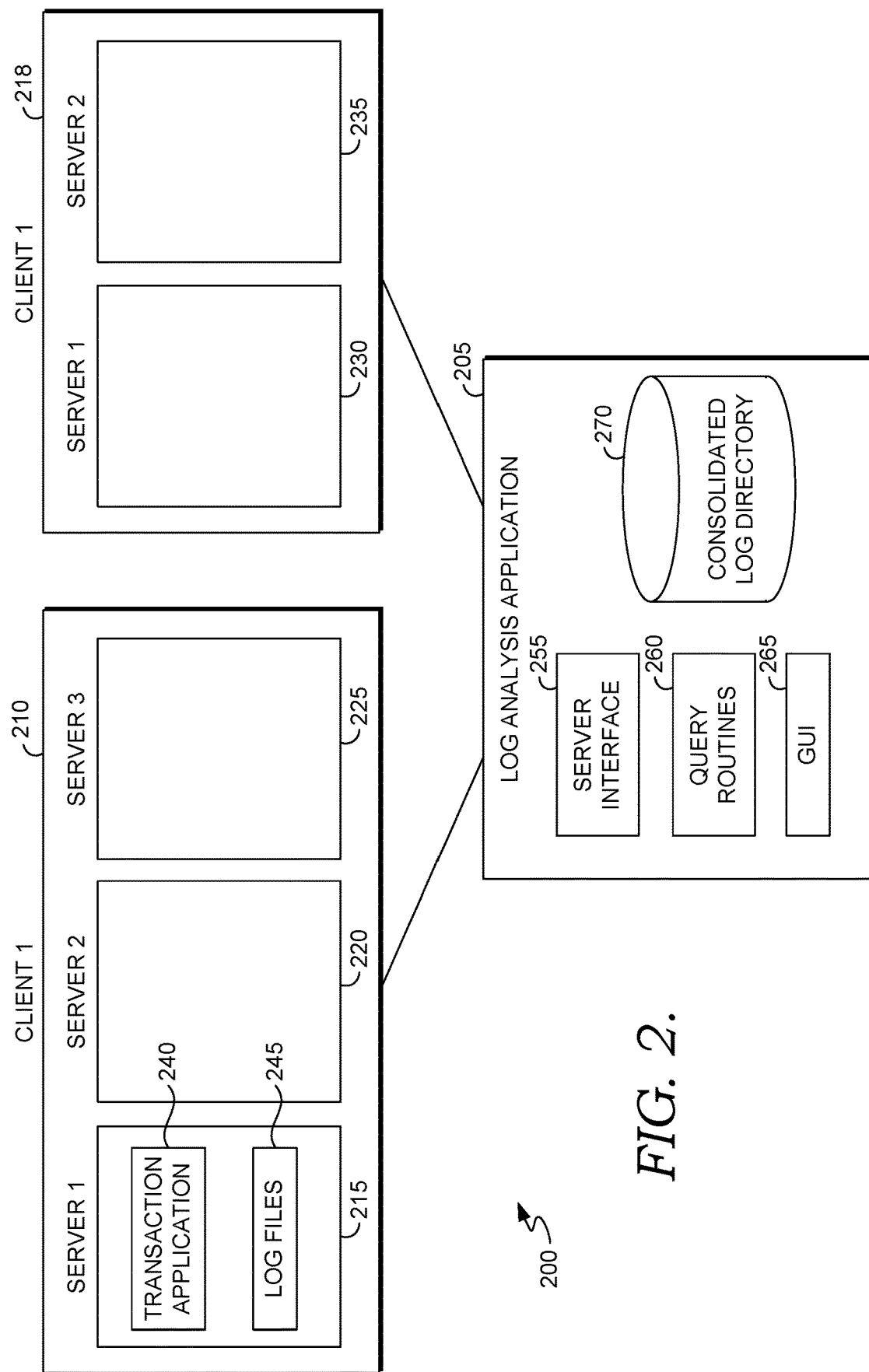
FIG. 2 is an exemplary system architecture suitable to implement embodiments of the present invention.

In an embodiment 200 exhibited by FIG. 2, a computer environment 200 is depicted for querying and analyzing log files, transaction application data, and output management systems for multiple virtual servers in a client environment is provided. Control server 102 hosts log analysis application 205. Log analysis application 205 is in communication with multiple client environments 210 and 218 via a network (not shown). A network, such as the internet or other public or private network, serves as a communications link from client servers 215-235 to control server 102. Tasks performed by the processor utilize a variety of computer technology. In one embodiment, control server 102 and client servers 215-235 are three tiers: a web server, application server and database server. Each tier is comprised of a number of system layers as described below.

Each of client environments 210 and 218 has multiple client servers. For instance, exemplary client environment 210 includes servers 215, 220, and 225. Client environment 218 includes servers 230 and 235. It will appreciated that the log analysis application 205 supports any number of client environments hosting and any number of servers in each client environment.

Client servers 215-235 may be any variety of servers including citrix servers running java virtual machines (JVM). Client servers 215-235 maintains active relational database files for transaction application 240 and are located remote to the control server 102 hosting the log analysis application 205 in a cloud-computing environment. The transaction application 240 facilitates electronic exchange of information between two parties to carry out financial or administrative activities related to health care. For example, a medical provider will send a claim to a medical or insurance plan to request payment for medical services.

Electronic transactions increase efficiencies in operations, improve the quality and accuracy of information, and reduce the overall costs to the system. Under HIPAA, HHS adopted certain standard transactions for the electronic exchange of health care data. These transactions include claims and encounter information, payment and remittance advice, claims status, eligibility, enrollment and disenrollment information, referrals and authorizations, coordination of benefits and premium payments. HIPAA-covered entities who conduct any of these transactions electronically must typically use standards facilitated by the transaction application 240.

Client servers 215-235 maintain log files 245. Log files 245 include incidents or problems within the client environment. For example, if a user in a client environment reports an incident within the client computing environment and a ticket is opened to address the problem. Additionally, the client environment may open a ticket if there has been an error or problem occurring within an application or the client environment.

The client servers are registered with log analysis application 205 by querying the active directory for client servers 215-235. Log analysis routine 250, when executed, registers the server 215 with log analysis application 205. Log files 245 are queried using Microsoft's Universal Naming Convention and the query results server 215 are transmitted to log analysis application 205. Server 215 transfers transaction application 240 to log analysis application 205.

Log analysis application 205 resides on a control server in a cloud-computing environment. Log Analysis Application 205 includes server interface 255, query routines 260, graphical user interface 265 and consolidated log directory 270. Server interface 255 is in communication with the log analysis routines 250 installed on each client server installs log analysis routine 250 on each client server. The server interface 255 communicates with log analysis routines 250 to import client server information, server log files 245 and transaction application 240 information to log analysis application 205. Log analysis application 205 consolidates client server information and transaction application 240 information in consolidated log directory 270.

Log analysis application 205 allows users to login in simultaneous to multiple servers in a client environment. Additionally, log analysis application 205 allows a user with authority to log into multiple client environments. Log analysis application 205 provides query routines 260 that can easily run by a user who is not familiar with SQL. Log analysis application 205 provides graphical user interfaces 265, as shown in FIGS. 7-22, for users to select the client environment for query and analyzation.

Figure 3:
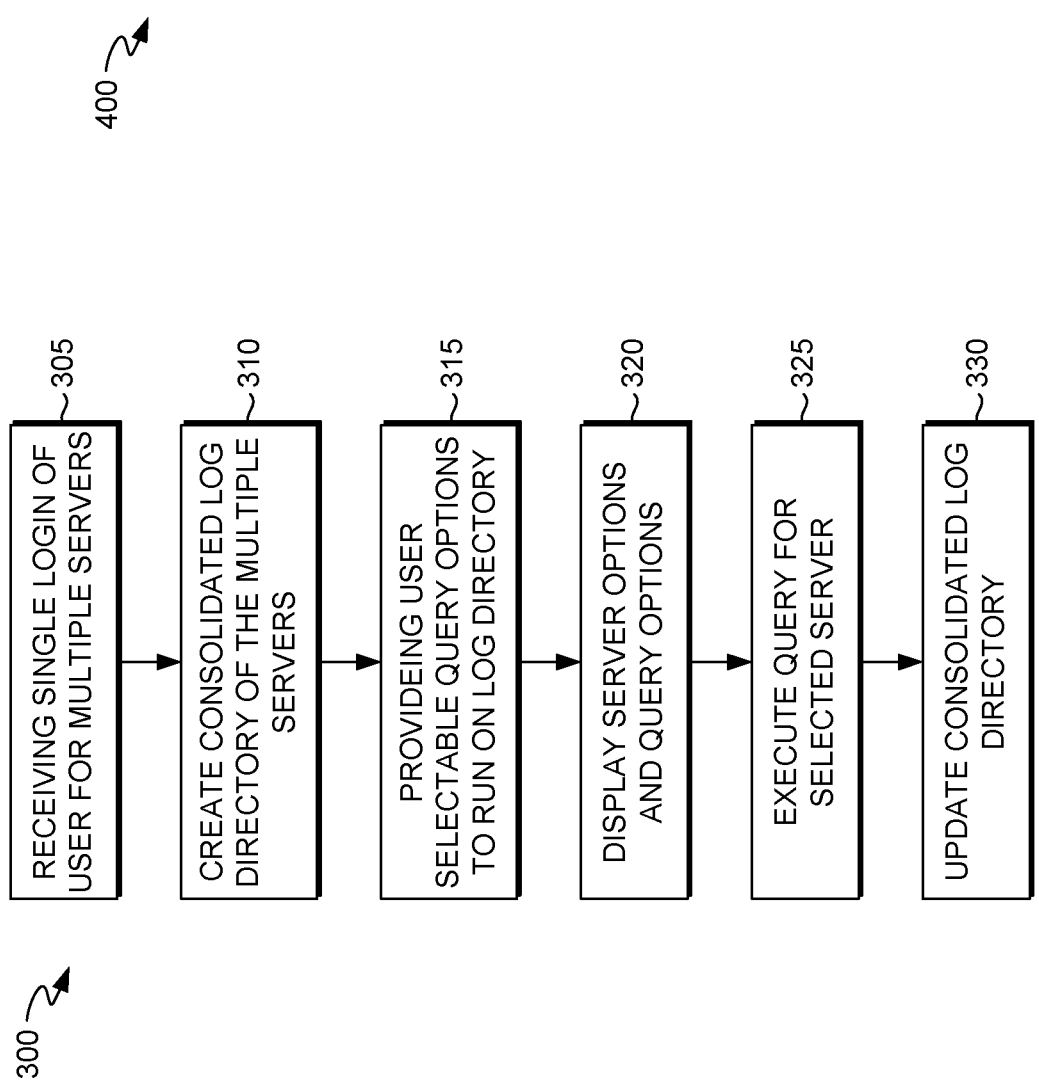
FIG. 3 is a flow diagram depicting a process to create and update a consolidated log directory.

With reference to FIG. 3, a method 300 for executing queries for one or more servers in a client environment is provided. At step 305, the log analysis application receives a single login from a user. The single login of a user to the log analysis application automatically logs the user into multiple servers in a client environment without having to individually log into each server. At step 310, a consolidated log directory of the multiple servers in the environment is created by the log analysis application. The consolidated log directory is created by querying the active directory of clients and pulling out all of the clients and servers, and storing the clients and servers and related information into a local database called ASP.accdb for use by the log analysis application. The client names and servers (except for the Document Management servers) used by the log analysis application are queried from the active directory and loaded into a local database called ASP.accdb.

Figure 12:
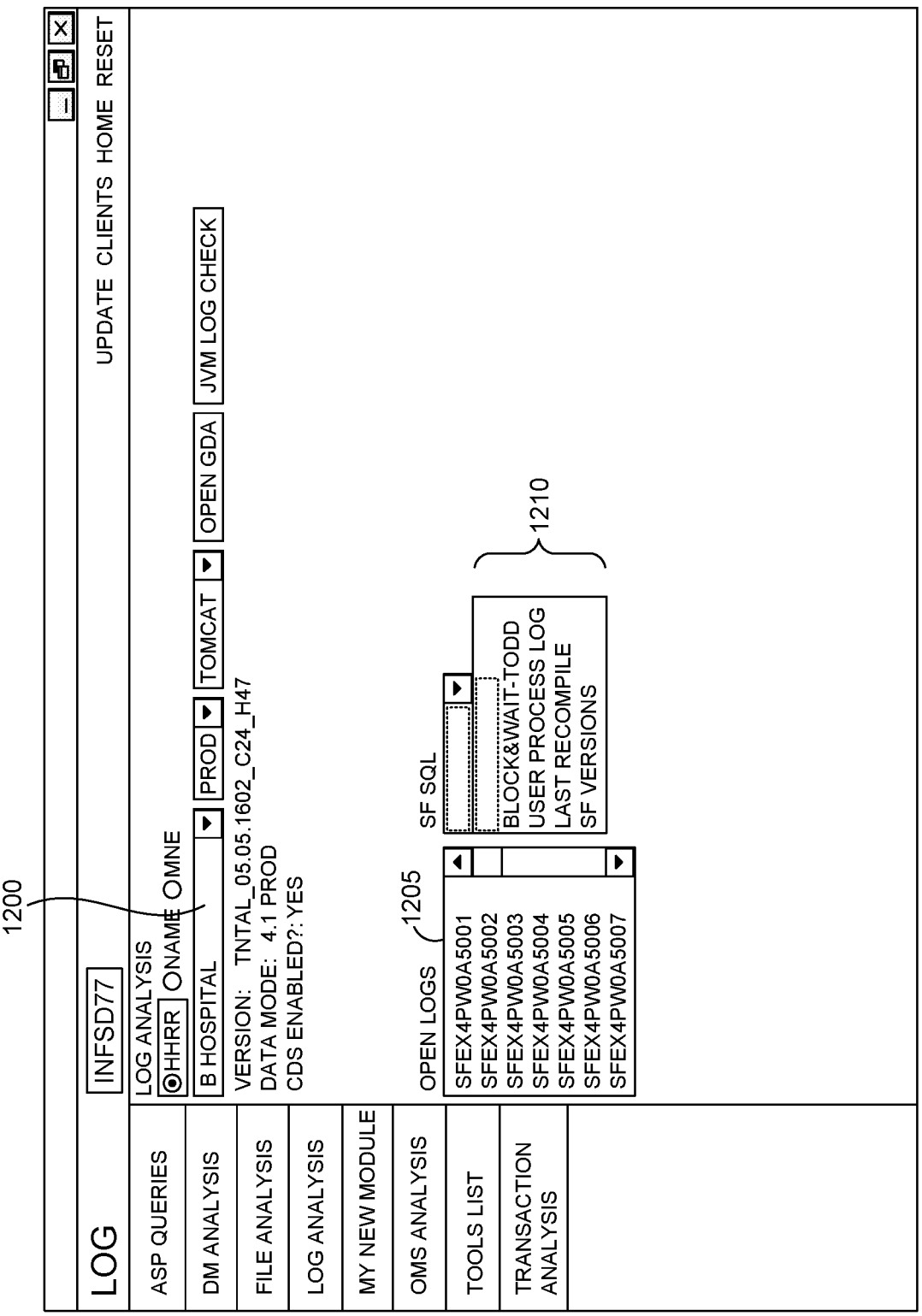
FIG. 12 is an interactive graphical user interface with selectable query options.
Figure 13:
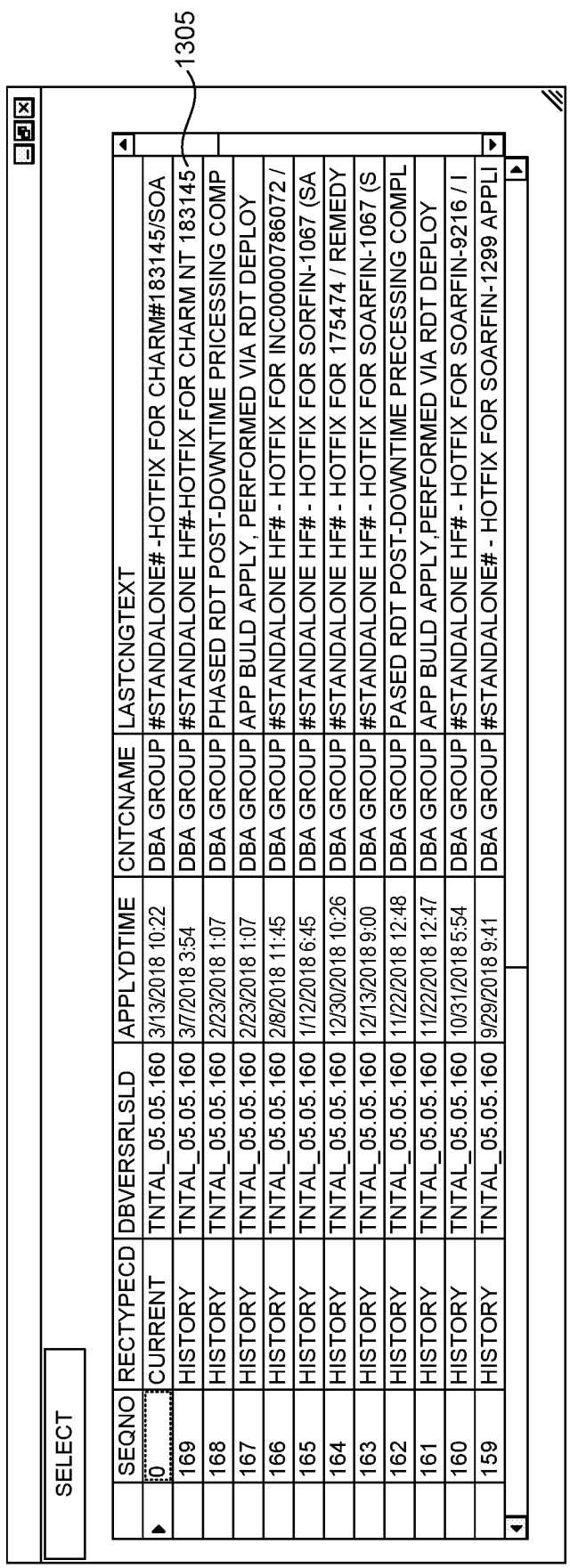
FIG. 13 is an interactive graphical user interface is displays log tickets in a client environment.
Figure 14:
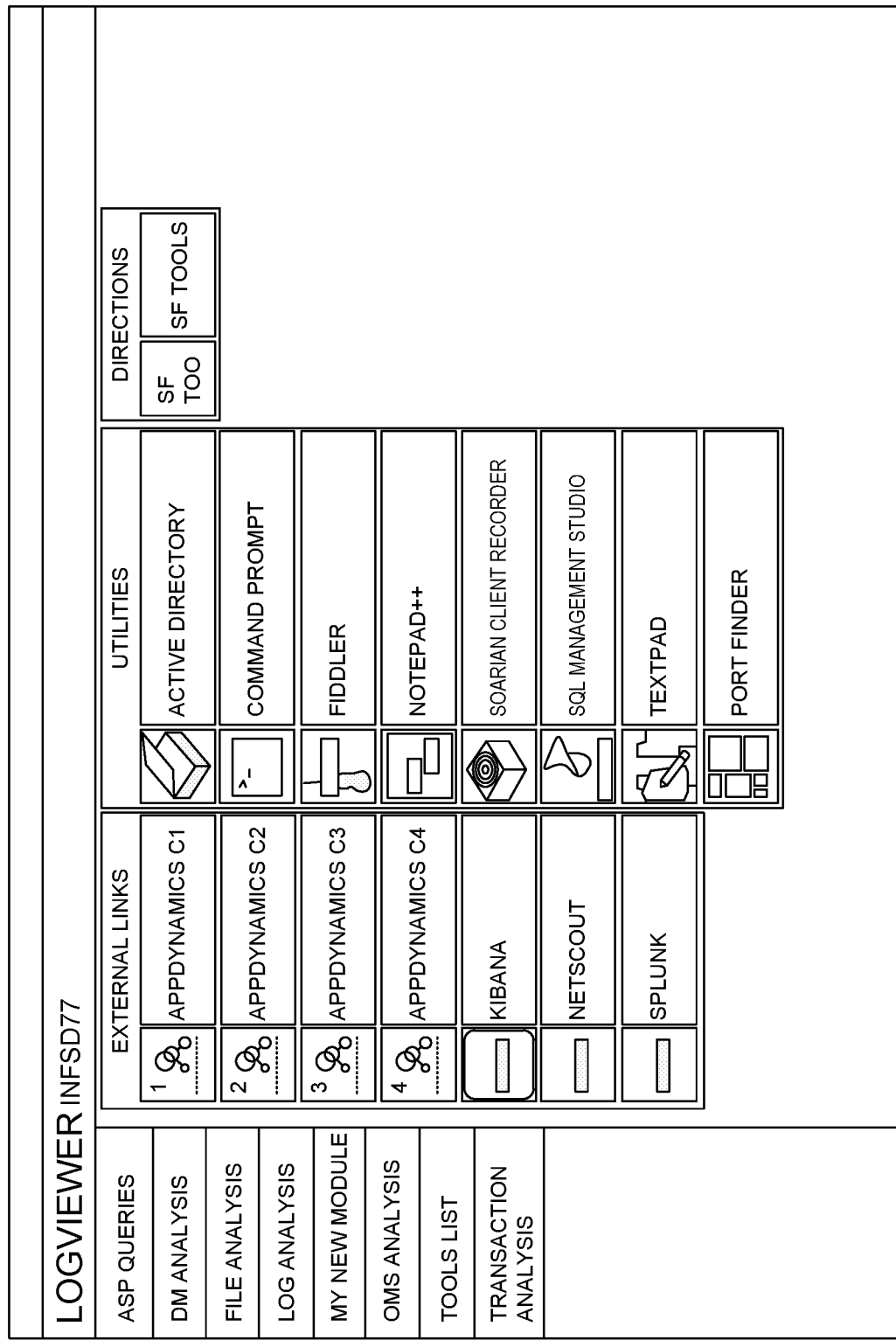
FIG. 14 is an interactive graphical user interface of troubleshooting tools.

At step 315, user selectable query options are provided by the log analysis application for the user to select one or more servers from the consolidated log directory to review or execute queries as shown in FIG. 12. At step 320, user selectable query options are displayed to the user by the log analysis application as shown in FIG. 12.

At step 325, the user selected query is selected for the one or more user selected servers. At step 330, the consolidated log directory is updated with the query results and the query results are provided to the user via log analysis application.

Figure 4:
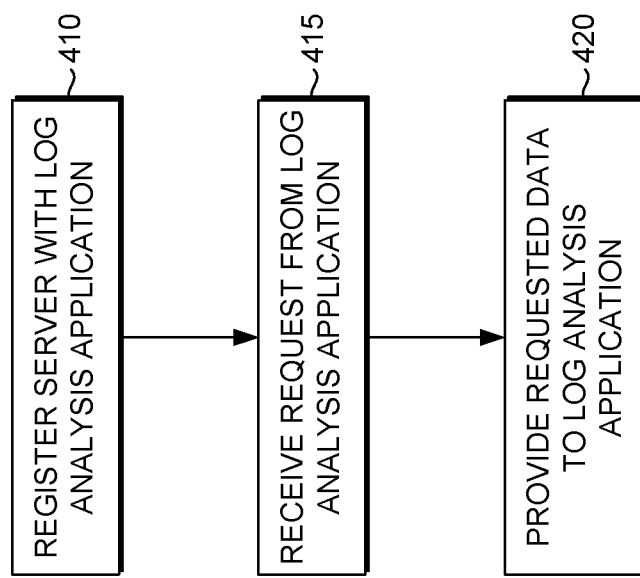
FIG. 4 is flow diagram depicting a process installing and register the server with the log analysis application.

With reference to FIG. 4, a method 400 for a client server registering and providing requested data to a log analysis application is provided. At step 405, an interface to the log analysis application such that the client server can communicate with the log analysis application and vice versa. At step 410, the server registers 410 with the log analysis application. As step 415, the server receives requests from the log analysis application. The request may be to provided log files and/or perform a query analysis on the server files. At step 420, the server provides the requested data to the log analysis application via the log analysis interface.

Figure 10:
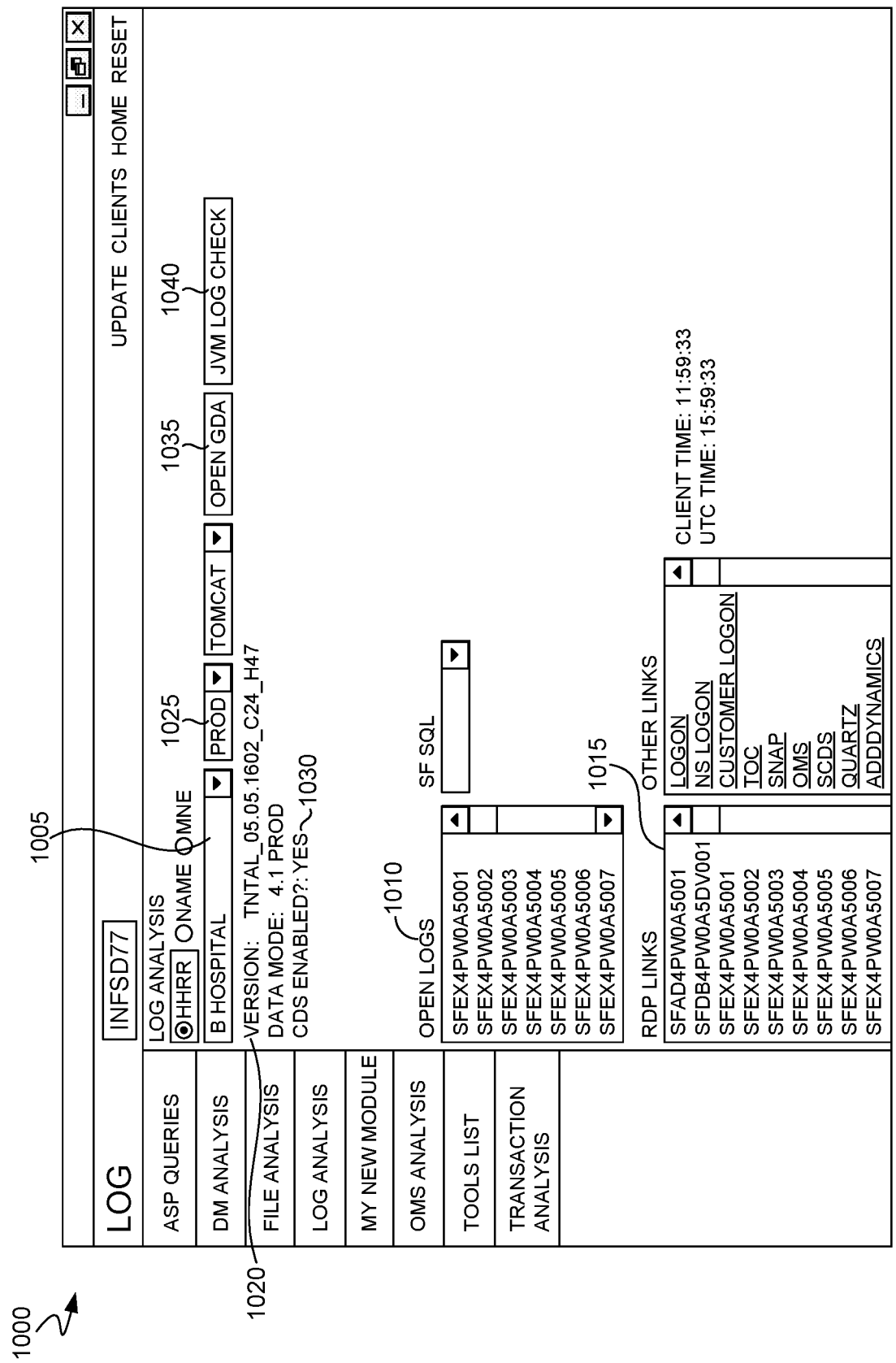
FIG. 10 is an interactive graphical user interface with servers for a client environment.

Referring next to FIG. 5, a method 500 for querying transaction data from a client server to locate and store errors in the transaction data is provided. At step 505, a user logs into the log analysis application as described in FIG. 3. At step 510, some types of transaction application data is imported from the selected server. The types of transaction application data that automatically gets imported into the log analysis application is the Version, data Mode, CDS Enabled, and Client Time as shown in FIG. 10. At step 515, a query is executed on transaction application data when the user selecting a query option from the graphical user interface. The queries that the user is able to select to execute are executed against the remote transaction database and the results of the query are returned to the log analysis application. At step 520, the consolidated log directory database of the log analysis application is updated with results of the query in the transaction data and are provided to the user on the graphical user interface at step 525.

FIG. 6 depicts a consolidated log directory and data updated and stored therein. The consolidated log directory lists client environment identification, server identification and server information. The consolidate log directory further includes client server identification and client environment and user selectable query options that can be executed on the log files and data from the servers. In addition, updates and results from the queries performed on the log files and data from the servers are retained in the consolidated log directory. Furthermore, any additional clients and/or servers that are supposed to be monitored by the log analysis application are maintained in the consolidated log directory.

Figure 7:
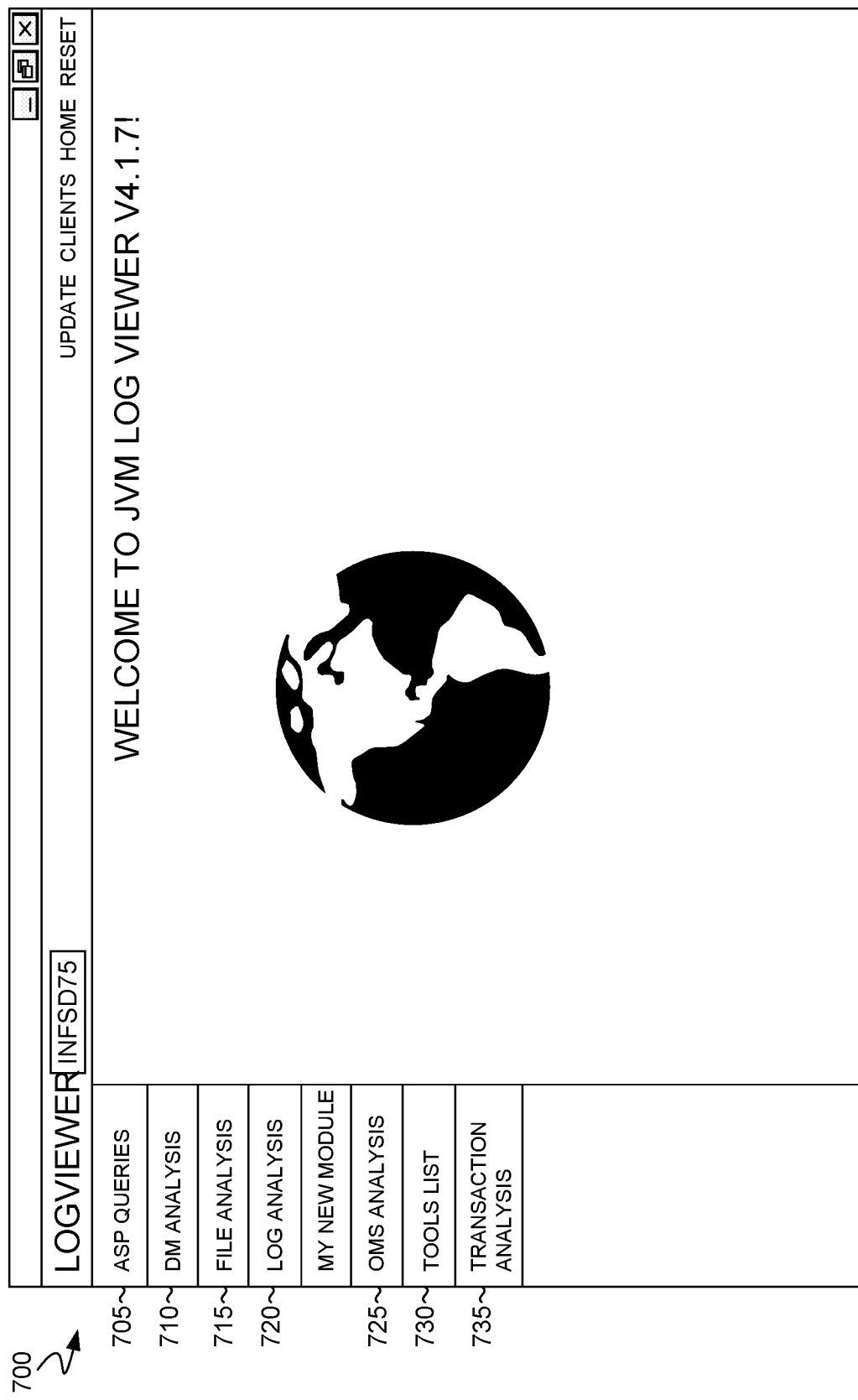
FIG. 7 is an interactive graphical user interface depicting query routines of the log analysis application.
Figure 9:
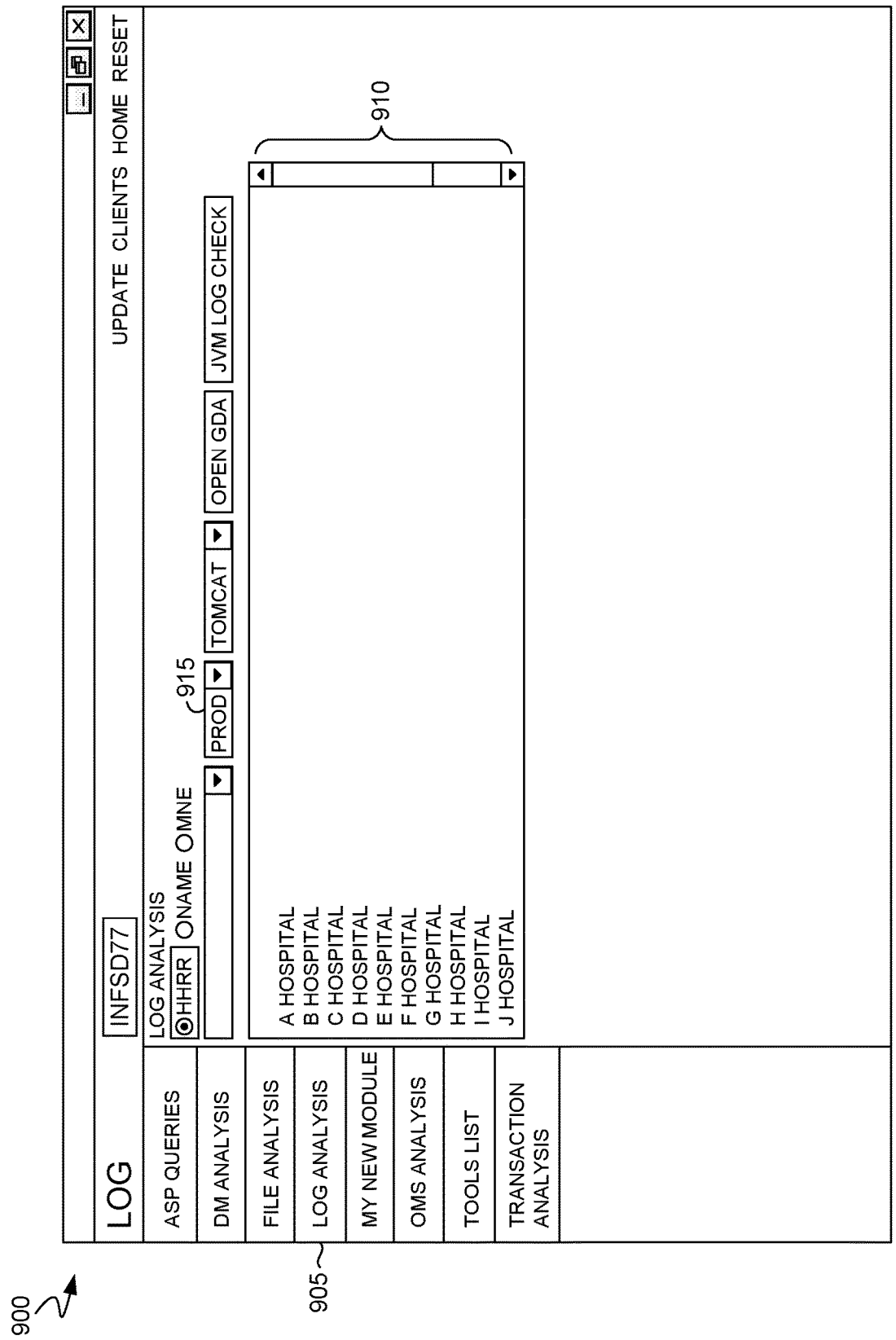
FIG. 9 is an interactive graphical user interface displaying client environments using the log analysis application.

As shown in the interactive graphical user interface 700 in FIG. 7, some of the query routines 260 provided by the log analysis application 205 include active server page (ASP) queries 705, document management (DM) analysis 710, file analysis 715, log analysis 720, output management system (OMS) analysis 725 and transaction analysis 735. Log analysis application 205 is built such that all of these queries and analysis can be performed on data from multiple servers in a client environment using a single tool, the log analysis application 205. Unlike prior solutions, the user does not need to log into separate servers, go searching for analysis tools or write their own SQL queries in order to analyze the data and logs from multiple servers in a client environment.

Graphical user interface 700 may also identify if there is a problem with one of the citrix servers by providing an identification of the server user is logged with the log analysis application in graphical user interface 700 (IN-FSD75). This is useful because it can be used to identify if there is a problem with one of the Citrix servers (the Citrix servers are what the support analysts log into in order to support the clients). This is done by identifying the Citrix server name and either checking with another analyst to see if they can recreate the problem on the Citrix server that they are logged into, or by logging out of the Citrix server and logging back in to a different Citrix server.

Referring to FIG. 8, interactive graphical user interface 800 depicts and sorts client environments by name, mnemonic code, HHRR acronym. User has the option to re-order the list. The listed client environments 805 are selectable by the user. For example, in FIG. 9, when the user selects from the interactive graphical user interface 900 the client environment 910 of interest, the Log analysis application 905 populates the graphical user interface with open log information for the client environment as shown in FIG. 10.

In FIG. 10, the user can select the remote desktop protocol (RDP) Links 1010 (used to log into client servers) for the client environment 1005. User can select open logs 1010 for the client environment 1005 or the user can select Other Links (used to launch the client application and other supporting applications). All of this information can be obtained from a single graphical user interface 1000 such that the user can enter multiple servers in the client environment without having to repeatedly log in. There are three choices in the dropdown menu: the client identification, the environment, and the environment type. Typically, the environment identifies whether the client environment is in production or is still in a testing phase. For example, environment=PROD or TEST and environment type=TOMCAT or WEBSPHERE. However, any variety of environments and environment types may be supported. These options may be defaulted if a particular environment and environment type are typically the same. This saves the user time by not having to select the values. The user only needs to select the client of interest. Log analysis application analyzes client reported incidents occurring in the client computer environment.

With reference to FIG. 10, the version 1020 of the transaction application software of this client environment is shown. The data mode of the environment 1025 is also shown in the graphical user interface. For example:

Label→Meaning
  a. PROD→Production
  b. TEST→Test
  c. TEST2→Test 2
  d. TRAIN→Training For example, a client may name their environment QA or DEV. These labels are not used in file directories on the backend though. The backed would use a label such as TESTS or TRAIN. When a client opens incidents, they often refer to the environment using their own label. So it is useful to see that data here in log analysis to ensure the correct environment is being analyzed.

CDS Enabled indicator 1030 identifies whether the client hosts a local Active Directory, or if the Active Directory is hosted remotely. A value of Yes indicates the Client is hosting their Active Directory locally.

User selectable options include Open GDA 1035 which opens a file directory that contains the financial transaction application configurations and other user files used by the transaction application. User selectable option JVM Log Check 1040 automatically runs SQL queries for determining for the selected server(s):

i. When the servers were last rebooted
  ii. How many common log files are created for today's date. This helps to identify when log files are wrapping which indicates a bad situation
  iii. If the JVMs running the application are experiencing any hung threads.
  iv. When the last Adaptability Deploy was (this is a utility that allows clients to customize the way certain screens look and behave.
  v. If there were any changes to CAE (these are client created expressions to help with worklisting and other activities).

Figure 11:
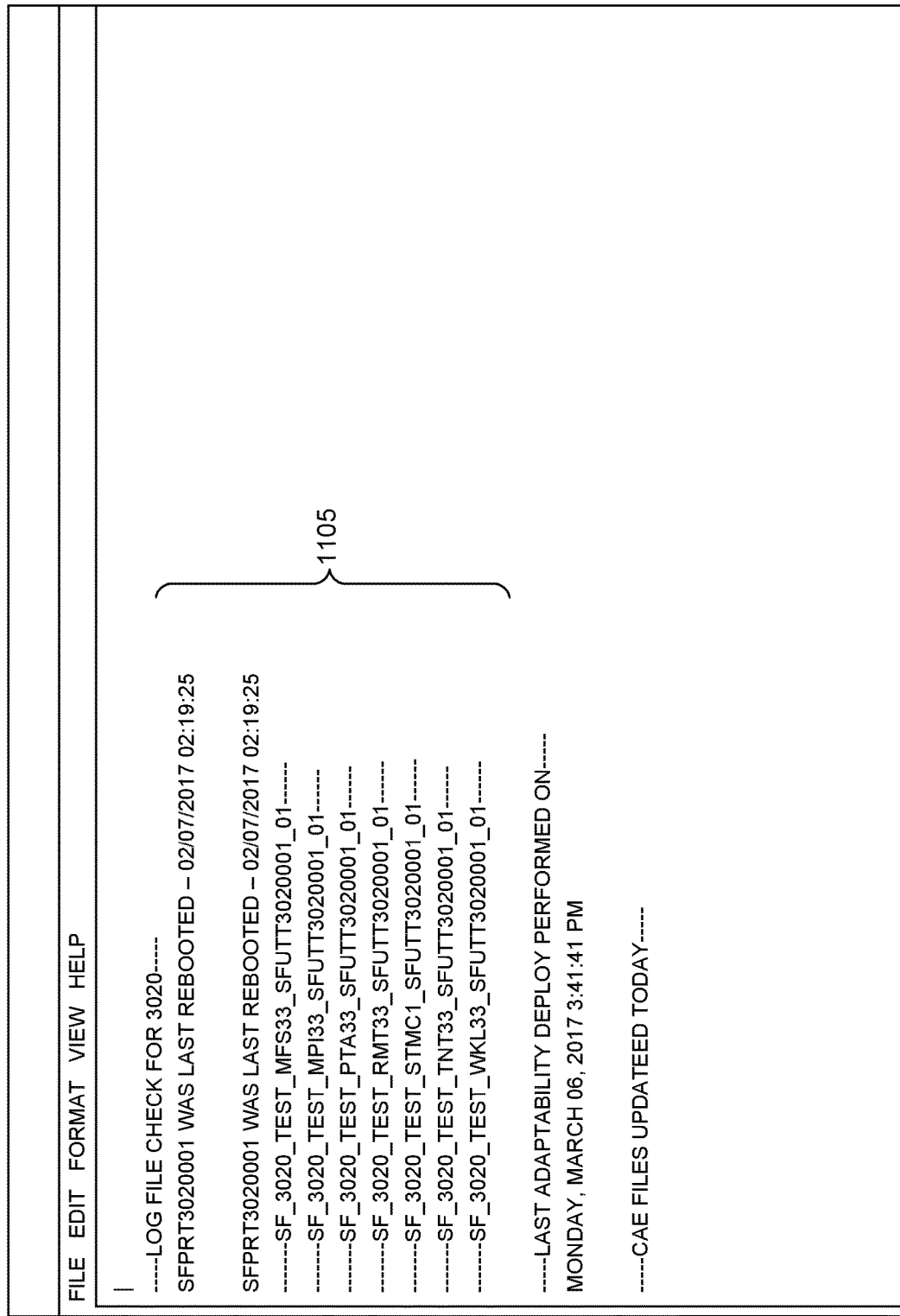
FIG. 11 is an interactive graphical user interface of a log file check.

As shown in FIG. 11, log application analysis provides a snapshot 1100 of what is going on in the client environment. An exemplary output 1105 of the query is displayed in FIG. 11. With reference to FIG. 12, user selection of open logs option 1205 allows a user to access the log directory with a single mouse click. Previous solutions require the user to log into a single server, navigate the log directory and then review log files. If the log messages are not located in the logs of this server, the user will have to repeat the steps for the next server and so on until the log message is located. Using the Open Logs 1205 section of the log analysis application, the user can eliminate the time consuming step of logging into the server, manually navigating to the log directory. An additional time saving step to eliminates the need to guess at what server a user should review.

Figure 23:
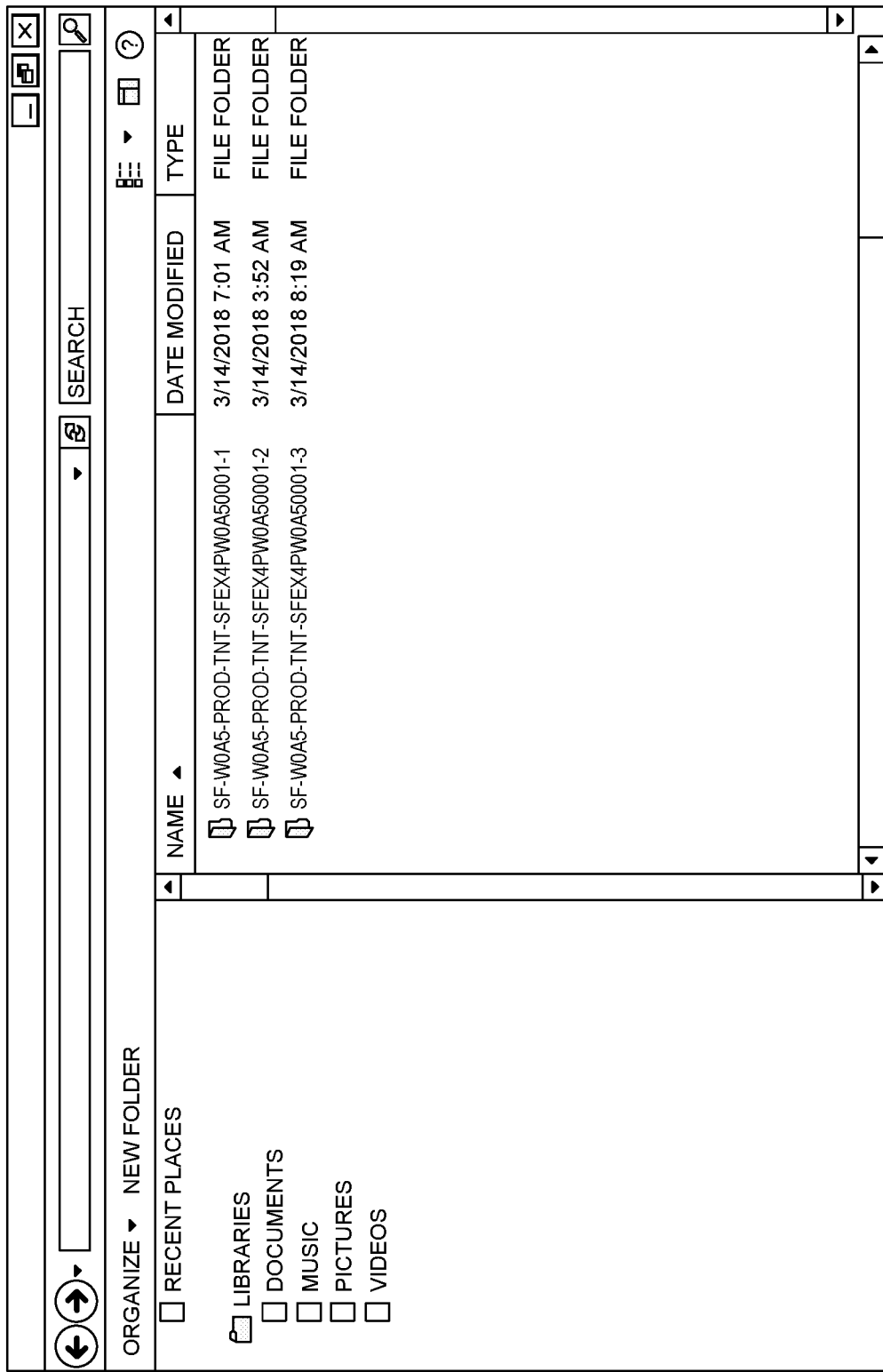
FIG. 23 is an interactive graphical user interface of logs for a client server.

Upon selecting the open logs 1205, log analysis application displays the logs for the selected server to the user as shown in FIG. 23. The user can scan the log to see open work tickets reporting issues on one of the servers in the client environment. The details of the work ticket 1 are displayed.

After selection of one or more server(s) a dropdown menu 1210 lists several useful SQL queries 210 that can be selected by a user are provided as shown in FIG. 12. Exemplary SQL queries that may be performed on open logs 1205 include: Block&Wait query that provides details about database blocking which is useful when troubleshooting performance issues: UserProcess Log query allows user to enter an end user ID and date/time range to identify what server the end user was logged into when a problem occurred. If the server to is unknown to the user, the user can select this SQL query to be performed based on the user ID, workstation, and date range. The operational database and tables are queried to identify the server a brief summary of the error details. Using the log analysis application, the user can query the identified server for full details on the error and work ticket. This is useful for a user, such as a support analyst, to identify which logs to review so that the support analyst does not have to guess at what server logs to review. Additionally, userprocess log query provides a history of the servers the user has logged into and is returned by the SF versions of the query.

Last Recompile queries the server data determine when a specific stored procedure was last recompiled. This is useful for performance analysis. SF Versions query queries the history of the software (transaction application) that applies to this client environment. This is useful in identifying if a newly applied version is causing a reported client issue. The actual queries are running on the log analysis application otherwise user would have to know how to write and execute the query.

With reference FIG. 12, when new client environments are turned over to the log analysis system, client access is needed. A user just needs to click on the Update Clients button and client environments are automatically queried. The active directory of clients is queried and pulls out all of the clients and servers, and stores them into a local database called ASP.accdb for use by the log analysis application. The client names and servers (except for the Document Management servers) used by the log analysis application are queried from the active directory and loaded into a local database called ASP.accdb With reference to FIG. 14, the log analysis application provides easy access to troubleshooting tools 1400 for the user to analyze of a client incident logs returned from the queries. Troubleshooting tools are often needed to research the issue. Tools included in the log analysis application tool module include links to many tools used on a daily basis. The tools can include internal tools and external (web) links which open performance related tools for troubleshooting.

One of the tools includes Microsoft SQL Management Studio. Typically, when users have to log into multiple servers, user preferences and configurations of Microsoft SQL Management Studio get lost. The log analysis application includes scripts such that if the Microsoft SQL Management Studio is launched from Tools List of the log analysis application, the tool will copy a local saved copy of the configuration into the running instance of the Microsoft SQL Management Studio. Upon exit of log analysis application, the configuration file is copied from the running instance and saved to the user's local directory. This way the list of configured servers is always available.

Figure 15:
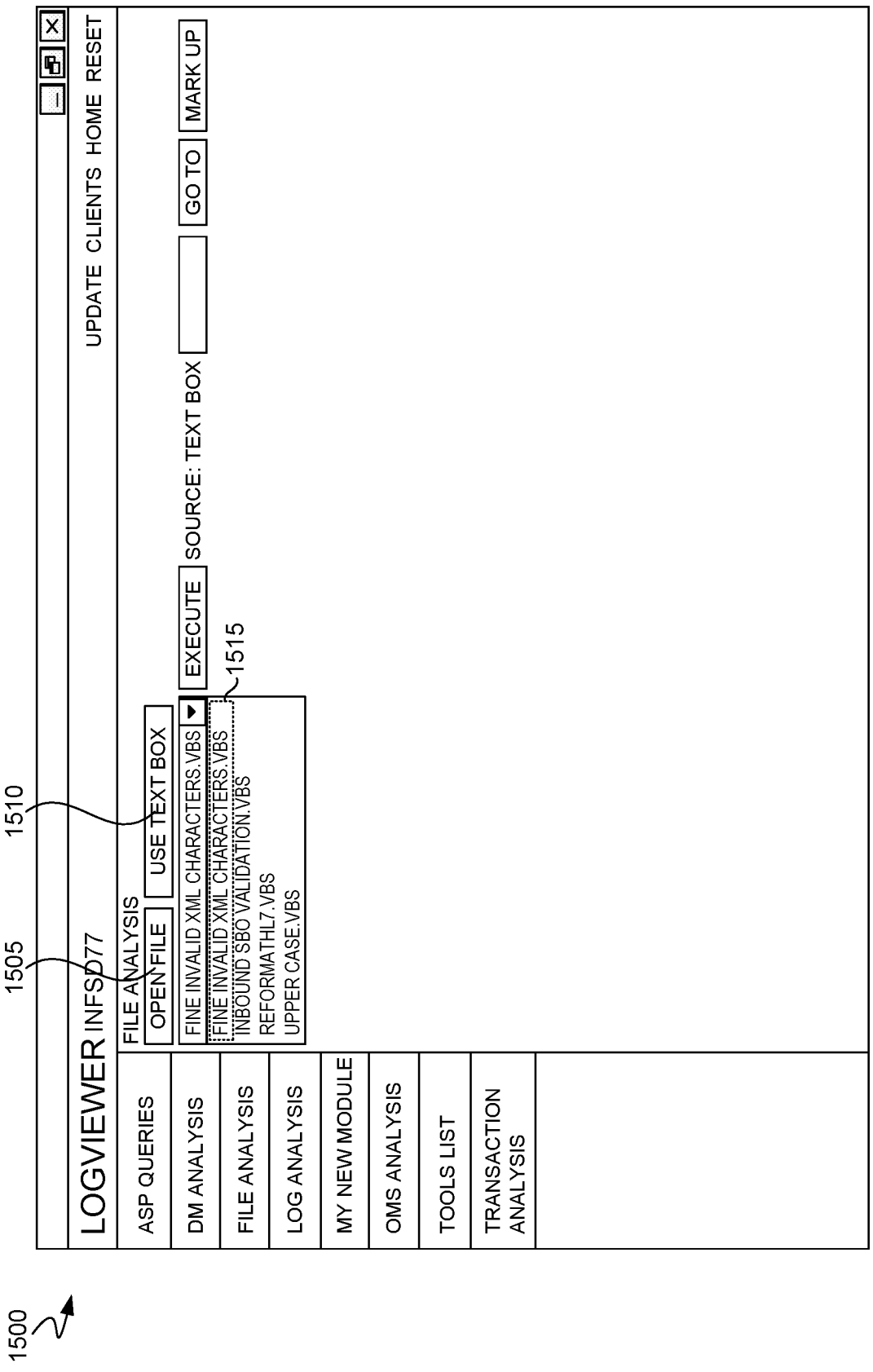
FIG. 15 is an interactive graphical user interface for performing queries on transaction application data.

Referring to FIG. 15, the log analysis application provides a file analysis tool 1500 such that user's can automatically have transaction application files analyzed. The file analysis tool 1500 makes it easy to analyze transaction data. The data can either be pasted into the top box of the window 1510, which is often how this module is used, or the file can be opened using the Open File button. Pre-configured scripts will execute against the data. In, this example there are four pre-configured scripts 1515 that will execute against the data.

The first pre-configured script, Find Invalid XML Characters.vbs script, identifies if the data is valid XML. If it is not valid, the script continues to parse the data as text. The ultimate goal is to find any characters with ASCII values not between 32 and 126, and not 10 or not 13. Any character that qualifies for this criteria will cause inbound interfaces to transaction application to go down. This causes the transaction to fail to process into the transaction application, and also stops any further transactions from processing into the transaction application before the problem is mitigated. This creates a time lag between when the client believes the data should be in transaction application and when the data actually populates into the transaction application. This script is helpful as some of the files can be quite large and so manually "eyeballing" the transaction to see if there is an invalid character is tedious. In addition, some of the invalid characters (like the "long dash" character) are valid XML characters, but will cause the interface to go down.

Figure 16:
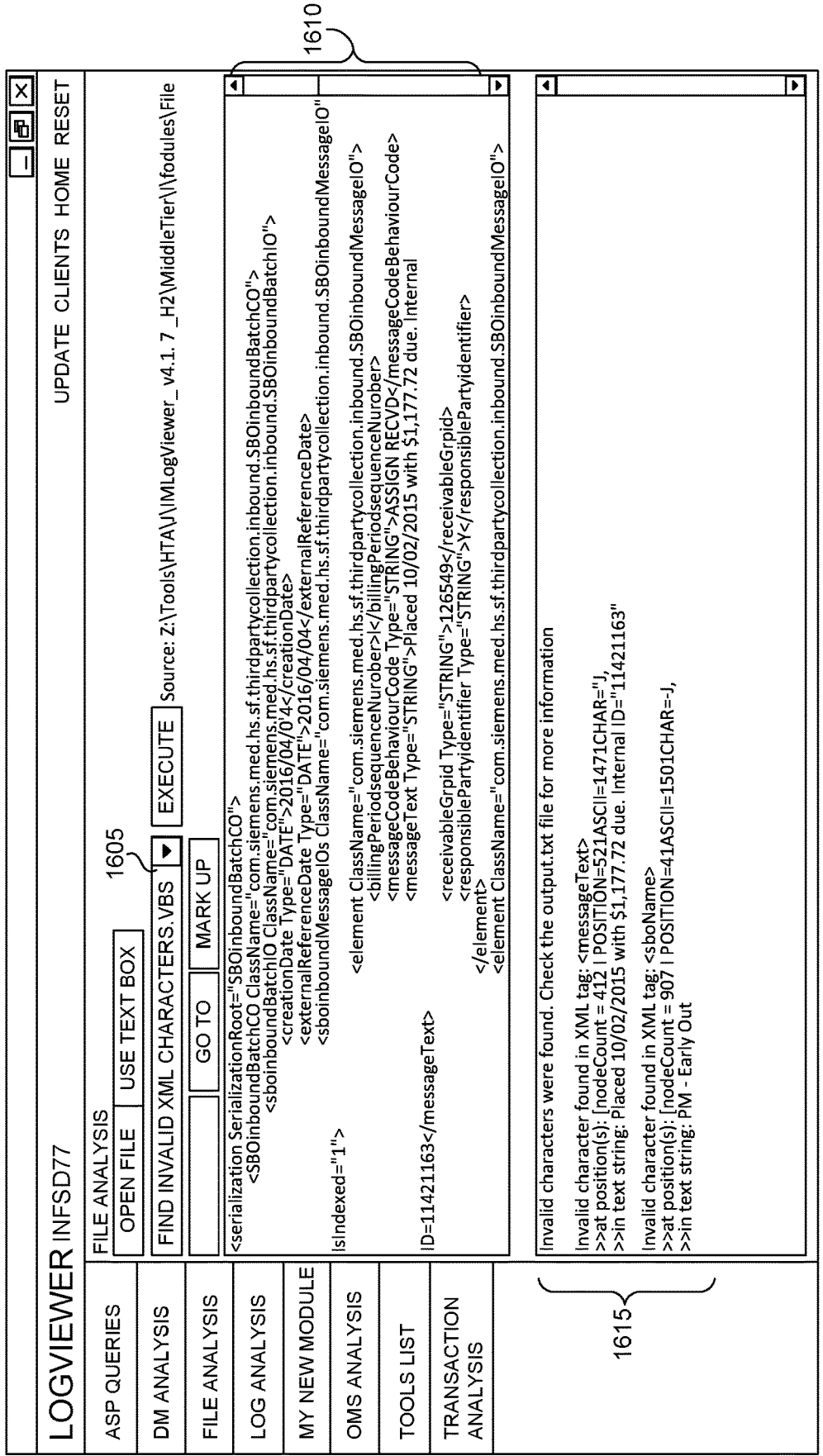
FIGS. 16-18 are interactive graphical user interface with results from a query of transaction application data.

These characters are impossible to identify with by eye. A "long dash" just looks like a normal. Because these are valid XML characters, other XML validation methods, like opening the file in Internet Explorer, or using XML Tools plugin for Notepad++ will not tell you there is a problem, because technically speaking, the XML is valid. When the above script is executed against the file, it is easy to see the problem. An example 1600 of running this script is shown in FIG. 16. The Invalid XML Characters.vbs script 1605 executes on transaction application data 1610 and returns errors or problems 1615 in the transaction application data 1610. In 1615, there are errors in the data in <messageText>element, and the data in <sboName> element. The type of double quote in the first error originates from Microsoft Word and causes a problem with the inbound interfaces. The second error, the "long dash" originates with Microsoft Word and again causes a problem with the inbound Interfaces.

Figure 17:
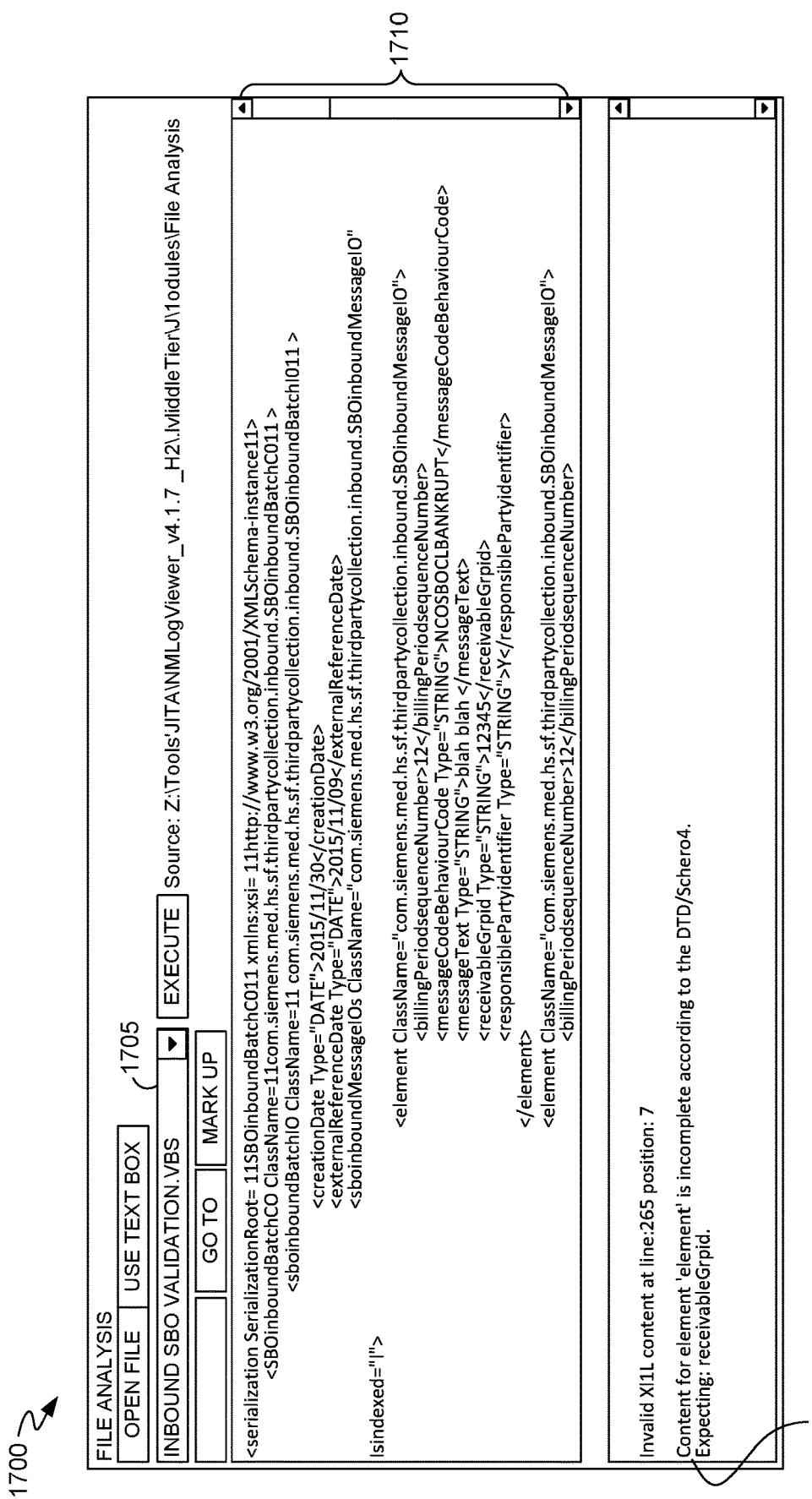

Another pre-configured script 1705 is Inbound SBO Validation.vbs 1705 as shown in FIG. 17. Inbound SBO transactions cause many problems for clients. These files are usually very large (5-10 MB) and are extremely time consuming to troubleshoot by eye. The XML Schema File is used to validate the exact format of the file 1710 to easily identify when there is bad data or when data is missing 1715.

An example of the output on a file that is missing a data element called receivableGrpId. By clicking the Mark Up button, the user is able to Go To the line of error, which is 265. The user selects "Go To (max 635) to go to the line in the data and the element missing is highlighted.

Another pre-configured script is reformatHL7.vbs. This script will take an HL7 transaction which has all of the segments on one line, and reformat it so that each segment is on its own line. This makes it much easier to read through an HL7 transaction.

Figure 18:
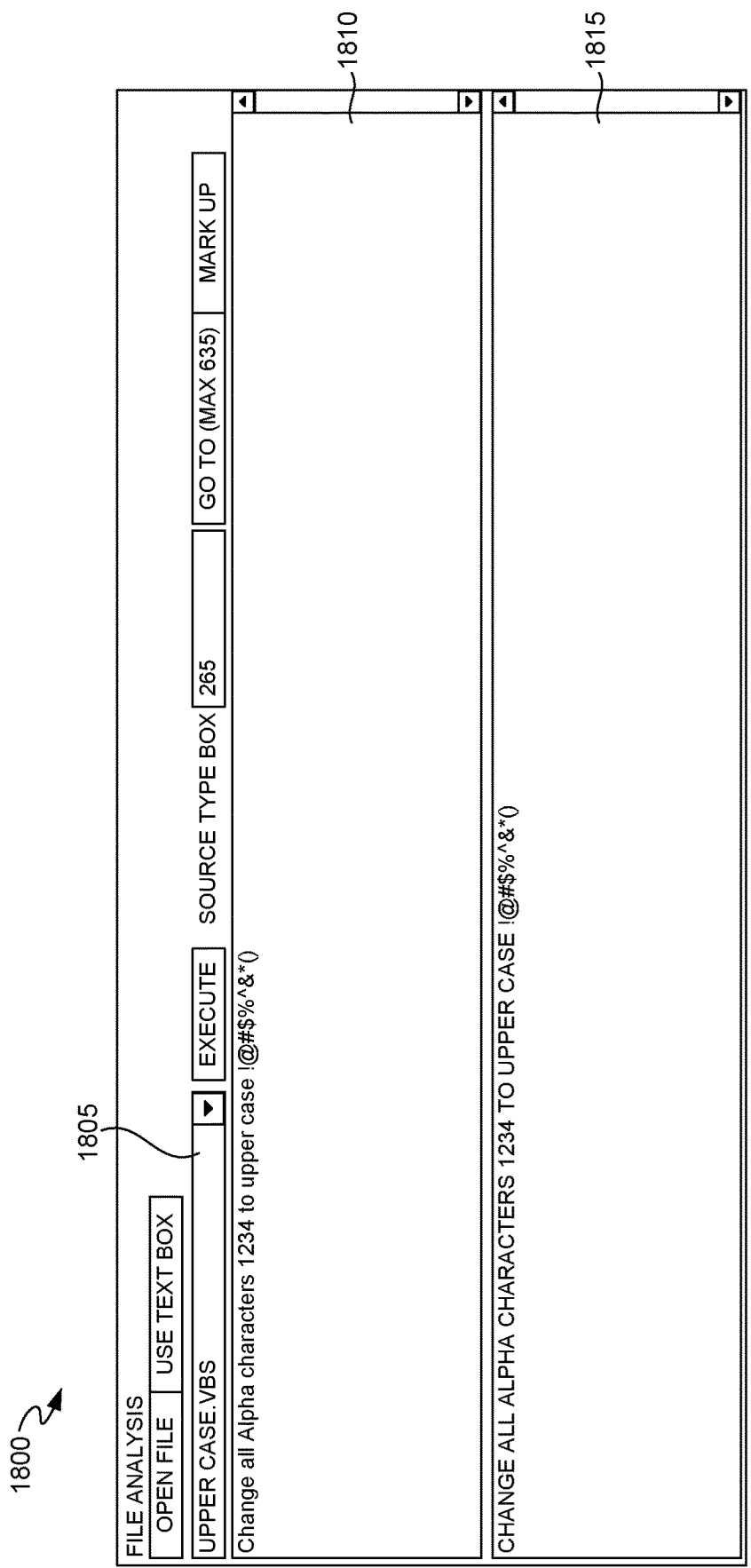

Graphical user interface 1800 of FIG. 18 depicts user selection of pre-configured script Upper Case.vbs script 1805 that changes every lower case alpha character to an upper case as shown in 1810 and 1815.

Figure 19:
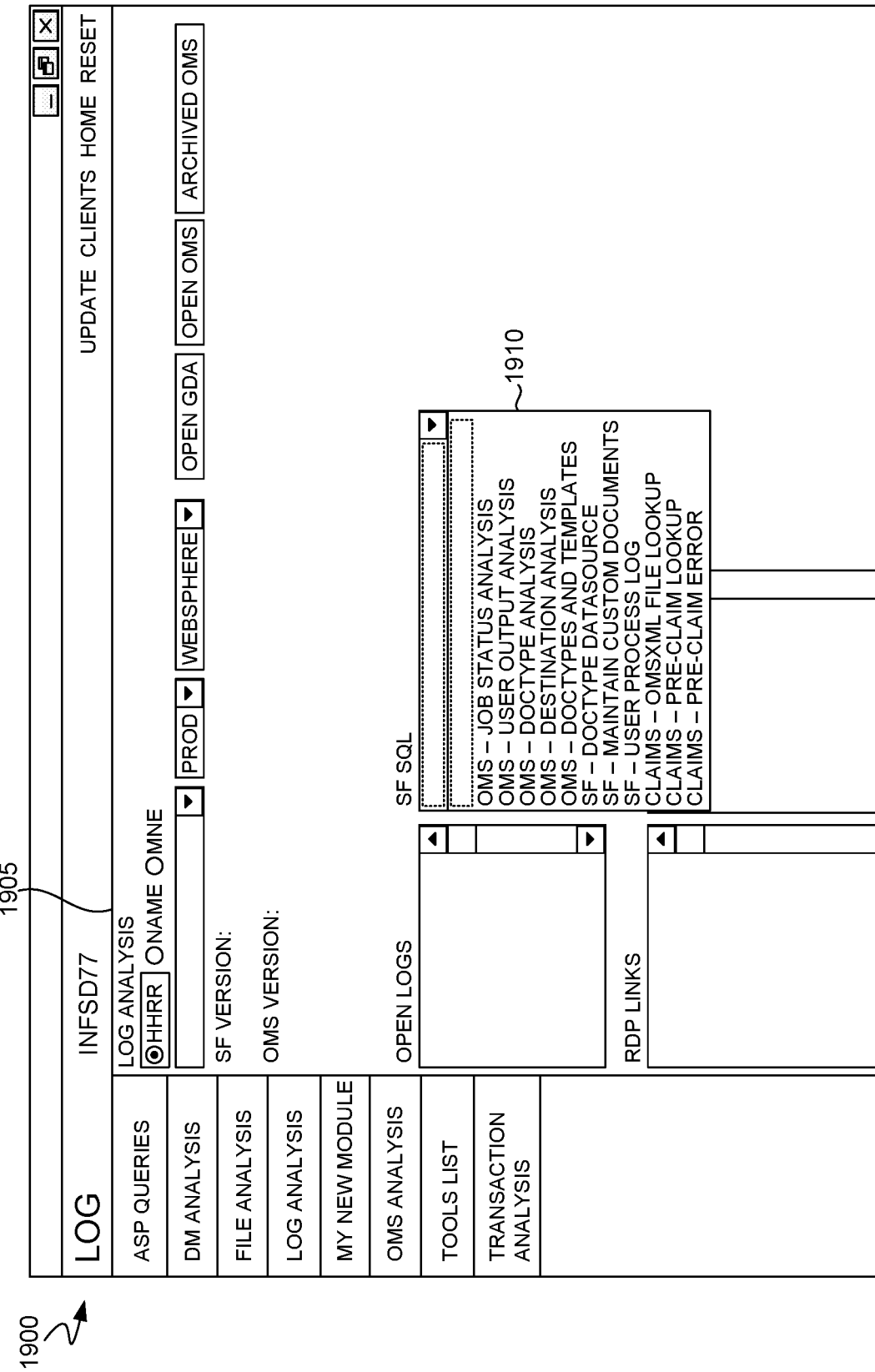
FIG. 19 is an interactive graphical user interface with user selectable query options.

Log analysis application is also in communication with output management system (OMS) that is a collection of printing services designed in the cloud. The most useful part of this module is the OMS Analysis SQL 1910 and OMS file queries 1910 as shown in FIG. 19. Interactive graphical user interface 1900 of log analysis application 1905 includes OMS—JobStatus Analysis query that provides a detailed table of everything that has errored in OMS. OMS—UserOutput Analysis query provides a detailed table of everything for a specific user. OMS—DocType Analysis query provides a detailed table of everything for a doctype. OMS—Destination Analysis query provides a detailed table of everything for a destination. OMS—DocType and Templates query provides information about what template a doctype uses. SF—DocType Datasource query provides DocType setup within the transaction application. SF—Maintain Custom Documents query provides a quick view of the maintain custom documents function. Claims—OMSXML File lookup query finds the oms xml file for a specific claim number. Claims—Pre-Claim Lookup query provides the pre-claim used for troubleshooting. Claims—Pre-Claim error query provides errors related to the pre-claim.

The log analysis application also can perform active server page (ASP) queries. The module will query a specific file across all client environments. The ASP query checks the heap setting for each client's production environments to see who was configured correctly and who was not. The query takes a few minutes to run but if one manually by signing into each client's server (approx. 120 servers just for the Production servers) and navigating to the configuration file, this would have taken days, if not weeks.

Log analysis Application also allows a user to review Document Management issues. This module behaves similarly to Log analysis queries, except is designed to work for Document Management.

Figure 20:
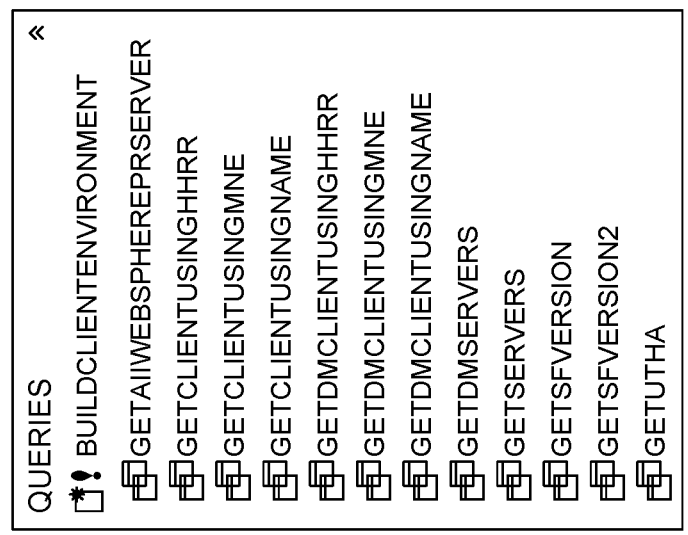
Figure 22:
FIG. 22 is an interactive graphical user interface of results of using the user build tool.

With reference to FIG. 20, is a screenshot of the queries saved in the log analysis application. Users have the option to create their own queries and use them to build their own modules. Users of the log analysis application can also create their own modules. The log analysis application handles all the complexities of adding the module to the navigation bar, loading the module into memory, and providing access to parent classes. From there, the can create the HTML/CSS and scripting the tasks that they want to complete.

The user can use the following steps to create a query module in the log analysis application. First, the user navigates to the modules directory and creates a folder in this directory with the name of the module. Within the newly created module, the user creates a HTML file with the same name. The HTML file is edited and executed. The file is saved in the log analysis application and the log analysis application is closed. When the log analysis application is launched again, the new module is available. The process provides the user the ability to building applications on top of the log analysis application.

With reference to FIG. 21, an interactive graphical user interface 2100 for creating a query to query the log analysis application database is shown. This can be used to create a report of the clients configured on the log analysis application. User selection of the module will execute the scripts and the requested information as a report of the clients as shown in graphical interface 2200 of FIG. 22.

To create custom modules in the log analysis application the ClientEnvironment class and instances of the QueryACCDB class are utilized. QueryACCDB allows the user to query the local ASP.accdb database. The two main functions are: executeQuery(userSQL) and executeSP(SPName,parmString). Function executeQuery(userSQL) is used to execute ad-hoc queries passed in by the user and executeSP(SPName,parmString)function is used to execute Saved Queries with the option to pass in a parameter string. To utilize this class, it must be included in the module. The Include sub routine is called at the top of the script section of the module: Include. At the bottom of the script section, the following sub routine is pasted:

Sub Include
   set f=fso.OpenTextFile("DataAccessLayer\queryACCDB\Classes\QueryACCDB.vbs")
   data=f.readAll
   ExecuteGlobal data
   f.Close
End Sub The clientenvironment represents an actual client environment in the ASP domain. I create an instance of this object in the HTA file and call it ce. To gain access to this object in a module, paste the following code into the top of the script section of the module:
SET CE=parent.ce
This allows the user to work with the CE object in the module. The main function of this object is setClient: Public Sub setClient(HHRR,ENVR_TYPE)
where ENVR_TYPE is a concatenation of the clients environment value, the underscore, and the environment type. Once the function is executed, the user has access to several useful properties:
   Public Property Get HHRR
   Public Property Get ENVR_TYPE
   Public Property Get ENVR
   Public Property Get dataMode
   Public Property Get cdsEnabled
   Public Property Get utServer
   Public Property Get prServer
   Public Property Get sfVersion
   Public Property Get OLTPSERVER
   Public Property Get APPCLUSTER
   Public Property Get DBCLUSTER
   Public Property Get DMVersion The present invention has been described in relation to particular embodiments, which are intended in all respects to be illustrative rather than restrictive. Further, the present invention is not limited to these embodiments, but variations and modifications may be made without departing from the scope of the present invention.

The invention claimed is:

1. One or more non-transitory computer-readable media having computer-executable instructions embodied thereon that, when executed, perform a method which improves a computer process on one or more computing devices including a control server and one or more databases communicating over a computer network for creating and updating a consolidated log directory in a cloud-computing environment, the method comprising:

receiving input, by the control server, for a single sign on for a user to log into multiple servers in a client environment simultaneously, the multiple servers hosting a transaction application for electronically exchanging transaction information between a client and a third party;

creating a consolidated log directory from log files from the multiple servers, the consolidated log directory comprising a database of user selectable server options for the multiple servers in the client environment;

providing user selectable query options to run queries performing troubleshooting analysis on the transaction information on one or more of the multiple servers from the consolidated log directory;

automatically generating, by the control server and based on the plurality of user selectable server options and the user selectable query options, a graphical user interface simultaneously displaying, via a screen, at least a graphical representation of each of the user selectable server options and the user selectable query options to the user from the consolidated log directory;

receiving input, by the control server, representing a user selection of one or more of the user selectable server options and at least one of the user selectable query options from the consolidated log directory;

executing, based on the user selection, a user selected query routine performing troubleshooting analysis on the transaction information for one or more selected servers, wherein the one or more selected servers correspond to the input representing the user selection of the one or more of the user selectable server options; and updating the consolidated log directory, by the control server, with query results corresponding to the troubleshooting analysis performed on the transaction information for the one or more selected servers.

2. The media of claim 1, wherein the transaction application for electronically exchanging transaction information between the client and the third party to carry out medical claims activities is a relational database application.

3. The media of claim 1, wherein each of the user selectable server options includes server identification in the client environment.

4. The media of claim 3, wherein the user selectable query options include whether the one or more selected servers have been rebooted.

5. The media of claim 3, wherein the user selected query routine determines, for the one or more selected servers, if and how many of the log files are common to each other during a particular period of time.

6. The media of claim 3, wherein the at least one of the user selectable query options includes how many virtual machines on each of the one or more selected servers are running the transaction application.

7. The media of claim 3, wherein the at least one of the user selectable query options includes changes to client created expressions made on each of the one or more selected servers.

8. One or more non-transitory computer-readable media having computer-executable instructions embodied thereon that, when executed, perform a method which improves a computer process on one or more computing devices including a control server and one or more databases communicating over a computer network for creating and updating a consolidated log directory in a cloud-computing environment, the method comprising:

receiving input, by the control server, for a single sign on for a user to log into multiple servers in a client environment simultaneously, the multiple servers hosting a transaction application for electronically exchanging transaction information between a client and a third party;

creating a consolidated log directory from log files from each of the multiple servers, the consolidated log directory comprising a database of user selectable server options for the multiple servers in the client environment;

providing user selectable open log query options to access open logs on one or more of the multiple servers from the consolidated log directory, wherein the user selectable open log query options are configured to execute SQL query routines that provide troubleshooting analysis of the transactional information on the one or more of the multiple servers from the consolidated log directory;

automatically generating, by the control server and based on the plurality of user selectable server options and the user selectable open log query options, a graphical user interface simultaneously displaying, via a screen, at least a graphical representation of each of the plurality of user selectable server options and the user selectable open log query options to the user from the consolidated log directory;

receiving input, by the control server, representing a user selection of one or more of the user selectable server options and at least one of the user selectable open log query options from the consolidated log directory;

executing, based on the user selection, an open log query routine for one or more selected servers, wherein the one or more selected servers correspond to the input representing the user selection of the one or more of the user selectable server options, and wherein the selected query routine corresponds to the input representing the user selection of the at least one of the user selectable open log query options; and updating the consolidated log directory, by the control server, with query results indicating the open logs for the one or more selected servers based on executing the open log query routine, wherein the results correspond to the troubleshooting analysis performed on the transaction information via the SQL query routines.

9. The media of claim 8, wherein the transaction application for electronically exchanging transaction information between the client and the third party to carry out medical claims activities is a relational database application.

10. The media of claim 9, wherein each of the user selectable server options includes server identification in the client environment.

\* \* \* \* \*